:::

United States Patent
Diep et al.

(10) Patent No.: US 7,624,262 B2
(45) Date of Patent: Nov. 24, 2009

(54) APPARATUS, SYSTEM, AND METHOD FOR BOOTING USING AN EXTERNAL DISK THROUGH A VIRTUAL SCSI CONNECTION

(75) Inventors: Catherine Cuong Diep, Cupertino, CA (US); Harold Hershey Hall, Jr., San Jose, CA (US); William Hugh McWherter, San Francisco, CA (US); Velnambi Yogalingam, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 512 days.

(21) Appl. No.: 11/613,549

(22) Filed: Dec. 20, 2006

(65) Prior Publication Data

US 2008/0155243 A1 Jun. 26, 2008

(51) Int. Cl.
*G06F 15/177* (2006.01)
(52) U.S. Cl. ................. 713/2; 713/1; 713/100
(58) Field of Classification Search .............. 713/1, 713/2, 100
See application file for complete search history.

(56) References Cited

U.S. PATENT DOCUMENTS

| | | | |
|---|---|---|---|
| 7,007,183 B2 | 2/2006 | Rawson, III | 713/324 |
| 7,010,633 B2 | 3/2006 | Arndt et al. | 710/243 |
| 7,062,559 B2 | 6/2006 | Yoshimura et al. | 709/226 |
| 2006/0095690 A1 | 5/2006 | Craddock et al. | 711/153 |

OTHER PUBLICATIONS

"Enterprise Grid Computing," ACM Digital Library, Strong, P. et al; 2005.
"IBM Mainframe Partitioning; LPAR vs. VM Function and Efficiency," Inspec, AN-7126476; 2001.
"Boot(HW)—UNIX system loader," Caldera International, Inc., 2003 http://docsrv.sco.com:507/en/man/html.HW/boot.HW.html.
"Step-by-step Virtualization configuration on an IBM eServer p5 server, part 1: configure VIO Server," Nam Keung et al., IBM eServer Solutions Enablement, 2005.
"Understanding Boot-From-SAN Technology," Matt Brisse et al., Dell Inc., 2005.

*Primary Examiner*—Nitin C Patel
(74) *Attorney, Agent, or Firm*—Kunzler & McKenzie

(57) ABSTRACT

An apparatus, system, and method are disclosed for booting a Logical Partition using an external storage device. The method creates a virtual SCSI device assigned to a first logical partition ("LPAR") of a first computer using a virtual I/O server by mapping a LUN of a storage volume to a SCSI ID. The storage volume is located external to the first computer and the first LPAR is configured to share one or more physical processors and one or more physical I/O devices of the first computer with a plurality of LPARs. The method receives a boot request to boot the first LPAR. The boot request identifies the storage volume as a boot device using the SCSI ID of the virtual SCSI device. The method retrieves boot data from the storage volume using a SCSI driver of the first LPAR and boots the first LPAR using the boot data.

19 Claims, 5 Drawing Sheets

APPARATUS, SYSTEM, AND METHOD FOR BOOTING USING AN EXTERNAL DISK THROUGH A VIRTUAL SCSI CONNECTION

BACKGROUND OF THE INVENTION

1. Field of the Invention

This invention relates to diskless booting and more particularly relates to booting a logical partition from an external disk using a virtual Small Computer System Interface ("SCSI") connection.

2. Description of the Related Art

A logical partition ("LPAR") may be created on a computer such as a mainframe computer. Traditionally, an LPAR is created by allocating a processor, memory, and dedicated input/output ("I/O") devices, and at least one hard disk drive ("HDD") that is physically within the computer. The computer includes physical resources to support a plurality of LPARS that share the physical computing resources of the computer. The LPAR is booted from the hard disk drive which contains an image of an operating system that runs on the LPAR. An LPAR may be considered a "virtual machine."

Typically, an application runs on the LPAR. In another embodiment, the application comprises a client application running on another host computer and accesses the computing resources of the LPAR running an application as a server. The LPAR accesses storage devices containing data associated with the application. The storage devices, in one embodiment, are part of one or more storage systems or subsystems of a storage area network ("SAN"). The LPAR accesses the SAN though shared physical I/O devices connected to the SAN and uses SAN drivers to locate and manipulate the data. An application accessing or running on an LPAR is often an application that configures large quantities of data in a database. For example, a financial institution may store financial transaction data on a SAN and may use an LPAR running a financial transaction application.

Typically, applications operating on an LPAR are designed to scale up as demand and use of the applications increases. Scaling up an application of an LPAR requires more and more physical resources of the computer. As the demand for shared physical resources increases, one LPAR may inhibit the performance of other LPARS on the system as the growing LPAR consumes more physical resources. In certain instances, the resource demands of the LPAR grow to the point that they exceed the available physical resources of the computer. Accordingly, it is desirable to migrate the LPAR to a different computer that includes more resources than the first computer in order to support the growth in resource needs of the LPAR.

However, moving an LPAR is complicated because the HDD used to boot the LPAR is local to the first computer. The HDD is physically connected to and located within the first computer. Significant time is required to remove or replicate this local HDD and install the original boot HDD or a copy of the boot image including the operating system on the original HDD on a second computer. If the HDD is damaged or in a physical location different than the second computer, moving the hard disk drive may be impractical or impossible. The process of copying the operating system image is time consuming.

Previous attempts to solve these problems have proposed booting an LPAR from a HDD located external to the computer where the LPAR is located. This booting from an external disk may be called diskless booting and is desirable because a new LPAR on a second computer can be quickly booted from the external HDD that contains the operating system image that was used to boot the first LPAR on the first computer.

Unfortunately, these attempts have had very limited success because specialized and proprietary BIOS must be programmed into the host bus adapters (HBA) of computers that attempt to boot from storage devices on the SAN. The main reason is that booting of an LPAR begins with the BIOS firmware in the HBA and must transition to software that is loaded and configured to identify and access the needed LPAR resources to complete the booting process.

This firmware is proprietary and specific to each hardware vendor requiring low-level application programming interfaces (APIs). This use of proprietary APIs further complicates the matter and tends to require that the computer and the storage devices come from the same hardware manufacturer. There is no common, open, standardized interface for hardware on the computer to communicate with storage devices on the SAN. Some have proposed that the computer enter a Pre-boot eXecution environment (PXE) which would then load a boot agent. However, this would also require standardization between hardware vendors. Others propose a Unified Extensible Firmware Interface (UEFI) standard, which again would require cooperation and agreement between hardware vendors. Because there is no standard BIOS for booting from a HDD on a SAN and no foreseeable agreement on such a standard, other solutions to the problem must be provided.

SUMMARY OF THE INVENTION

From the foregoing discussion, it should be apparent that a need exists for an apparatus, system, and method for booting an LPAR using an external disk through a virtual SCSI connection. Beneficially, such an apparatus, system, and method would boot an LPAR based on a one-to-one mapping of a HDD external to the computing system servicing the LPAR and a virtual SCSI device defined for the LPAR.

The present invention has been developed in response to the present state of the art, and in particular, in response to the problems and needs in the art that have not yet been fully solved by currently available LPARs. Accordingly, the present invention has been developed to provide a computer program product, an apparatus, system, and method for booting an LPAR using an external disk through a virtual SCSI connection that overcomes many or all of the above-discussed shortcomings in the art. The computer program product includes a computer readable medium having computer usable program code programmed for booting a computer Logical Partition using an external storage device. The operations of the computer program product include creating a virtual Small Computer System Interface ("SCSI") device assigned to a first logical partition ("LPAR") of a first computer using a virtual input/output ("I/O") server by mapping a logical unit number ("LUN") of a storage volume to a SCSI ID uniquely associated with the virtual SCSI device. The virtual I/O server is configured to map a physical I/O device of the first computer to one or more LPARs on the first computer. In one embodiment, the storage volume includes either a storage device or a group of storage devices configured in a storage subsystem.

The storage volume is located external to the first computer (i.e. physically outside the first computer housing and components and is in communication by way of a storage area network). The first LPAR is configured to share one or more physical processors and one or more physical I/O devices of the first computer with a plurality of LPARs.

The operations further include receiving a boot request to boot the first LPAR, the boot request identifying the storage volume as a boot device using the SCSI ID of the virtual SCSI device and retrieving boot data from the storage volume using a SCSI driver of the first LPAR. Finally, the operations include booting the first LPAR using the boot data.

In one embodiment, the LUN of the storage volume includes a LUN within a storage area network ("SAN") uniquely associated with the storage volume. In another embodiment, the virtual I/O server maps a LUN for the storage volume to the SCSI ID for the virtual SCSI device of the first LPAR through a shared physical host bus adapter in the first computer connected to the storage volume of the SAN over a fiber channel connection. In certain embodiments, the virtual I/O server receives SCSI commands directed to the virtual SCSI device and issues corresponding commands to the storage volume that are compatible with the communication protocol of the storage volume. The corresponding commands to the storage volume may be SAN commands.

In one embodiment, the mapping of a SCSI ID of the virtual SCSI device to a LUN of the storage volume further comprises a unique one-to-one mapping between a LUN of the storage volume and the virtual SCSI device. Typically, the LUN is a virtualized drive and may include a single drive or a group of drives mapped together as a LUN. For example, a LUN may map to a redundant array of inexpensive/independent disks ("RAID") array. The first computer system may boot the virtual I/O server prior to creating the virtual SCSI device associated with the first LPAR. In certain embodiments, the first LPAR accesses SAN data storage volumes using SAN drivers, however, the SAN data storage volumes are different from the boot storage volume mapped to the virtual SCSI device.

In certain embodiments, the virtual I/O server executes within a virtualization module configured to manage and control a plurality of physical processors, a plurality of physical communication adapters, a plurality of physical storage devices, and memory to provide virtual processors, virtual communication adapters, virtual storage devices, and memory to a plurality of LPARS. The virtualization module may include a POWER HYPERVISOR configured to execute on a Performance Optimization With Enhanced RISC 5 ("POWER5™") architecture.

In another embodiment, the computer program product includes operations to create a second virtual SCSI device on a second LPAR of a second computer that also maps to the same LUN of the storage volume, the second computer having more physical resources than the first computer and executing a second virtual I/O server. The operations include configuring the second LPAR to boot from the second virtual SCSI device and shutting down the first LPAR on the first computer. Next, the operations include receiving a boot request to boot the second LPAR, the boot request identifying the storage volume as a boot device using the SCSI ID of the second virtual SCSI device, retrieving boot data from the storage volume using a SCSI driver of the second LPAR, and booting the second LPAR using the boot data.

The apparatus to boot a logical partition using an external storage device is provided with a plurality of modules configured to functionally execute the necessary steps of the computer program product described above. These modules in the described embodiments include a virtual SCSI device module configured to create a virtual Small Computer System Interface ("SCSI") device assigned to a first logical partition ("LPAR") of a computer using a virtual input/output ("I/O") server by mapping a logical unit number ("LUN") of a storage volume to a SCSI ID uniquely associated with the virtual SCSI device, a boot request module configured to receive a boot request to boot the first LPAR, the boot request identifying the storage volume as a boot device using the SCSI ID of the virtual SCSI device, a boot data module configured to retrieve boot data from the storage volume using a SCSI driver of the first LPAR, and a boot module configured to boot the first LPAR using the boot data.

The virtual I/O server is configured to map a physical I/O device of the computer to one or more LPARs on the computer. The storage volume is located external to the computer. The first LPAR is configured to share one or more physical processors and one or more physical I/O devices of the first computer with a plurality of LPARs.

The apparatus, in one embodiment, is configured to include a SAN access module configured to access SAN data storage volumes from the first LPAR using SAN drivers, wherein the SAN data storage volumes do not include the same storage volume that is mapped to the virtual SCSI device.

A system of the present invention is also presented to boot a logical partition that shares physical processors using an external storage device. The system may be embodied using various combinations of hardware and software. In particular, the system, in one embodiment, includes a storage area network ("SAN"), a storage volume accessible through the SAN by a unique logical unit number ("LUN"), and a computer in communication with the storage volume through the SAN.

The computer includes one or more logical partitions ("LPAR") each configured to share one or more physical processors and one or more physical I/O devices of the computer. The computer also includes a virtual input/output ("I/O") server configured to map a physical I/O device of the computer to the one or more LPARs on the computer. The virtual I/O server executes within a virtualization module configured to manage and control a plurality of physical processors, a plurality of physical communication adapters, a plurality of physical storage devices, and memory to provide virtual processors, virtual communication adapters, virtual storage devices, and memory to the one or more LPARS.

A virtual SCSI device module of the computer is configured to create a virtual Small Computer System Interface ("SCSI") device assigned to a first LPAR of the computer using the virtual I/O server by mapping a LUN of the storage volume to a SCSI ID uniquely associated with the virtual SCSI device. A boot request module of the computer is configured to receive a boot request to boot the first LPAR, the boot request identifying the storage device as a boot device using the SCSI ID of the virtual SCSI device. A boot data module of the computer is configured to retrieve boot data from the storage volume using a SCSI driver of the first LPAR, and a boot module is configured to boot the first LPAR using the boot data.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
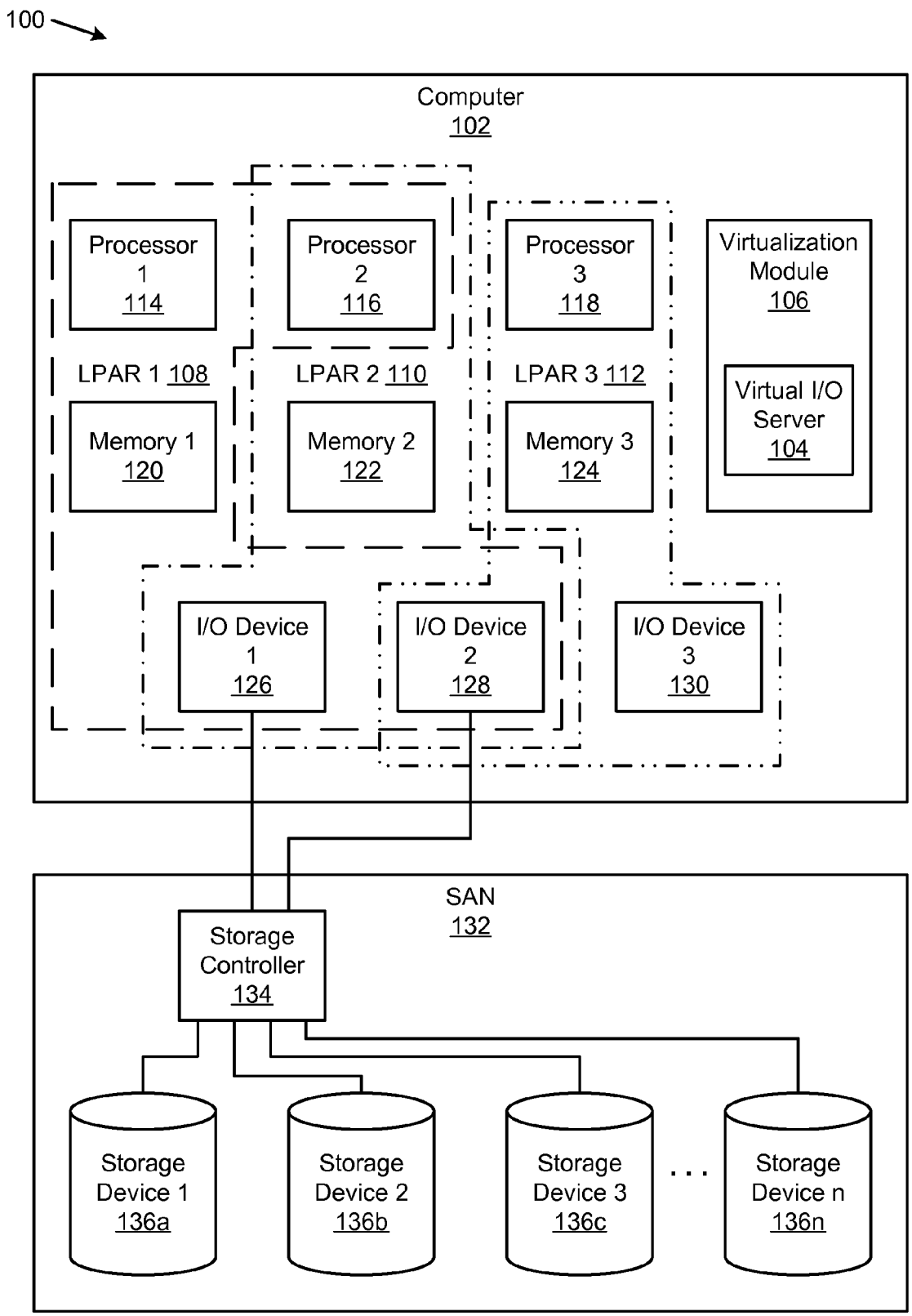
FIG. 1 is a schematic block diagram illustrating one embodiment of a system for booting a Logical Partition using an external storage device in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams described herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram illustrating one embodiment of a system 100 for booting a Logical Partition using an external storage device in accordance with the present invention. The system 100 includes a computer 102 configured with a virtual I/O server 104 executing within a virtualization module 106, three Logical Partitions ("LPARs") 108, 110, 112, three processors 114, 116, 118, three memories 120, 122, 124, and three input/output ("I/O") devices 126, 128, 130. The system 100 also includes a storage area network ("SAN") 132 with a storage controller 134 and storage devices 136. The components of the system 100 are described below.

The system 100 includes a computer 102 configured with one or more LPARs 108, 110, 112. The computer 102 is typically a mainframe computer. In one embodiment, the computer 102 is configured with a Performance Optimization With Enhanced RISC 5 ("POWER5™") architecture by IBM®. Typically, the computer 102 is configured to run one or more applications. The applications run on one or more LPARs 108, 110, 112. The computer 102 is typically configured with LPARs 108, 110, 112 running as servers and is connected to one or more host computers accessing the applications. The host computers may be connected to the computer 102 through the Internet, a local area network ("LAN"), a wide area network ("WAN"), an optical fiber network, and the like. In one embodiment, the computer 102 is part of a SAN 132. In another embodiment, the computer 102 is connected to a SAN 132.

The computer 102 includes a virtual I/O server 104 executing within a virtualization module 106 configured to manage the I/O devices 126, 128, 130 of the computer 102 and their allocation to the LPARs 108, 110, 112. The virtual I/O server 104 acts as an I/O server to the LPARs 108, 110, 112 and is configured to map one or more physical I/O devices 126, 128, 130 to one or more LPARs 108, 110, 112. The virtualization module 106 is configured to manage and control multiple processors 114, 116, 118, physical communication adapters 126, 128, 130, physical storage devices, and memory 120, 122, 124 to provide virtual processors, virtual communication adapters, virtual storage devices, and memory to one or more LPARs 108, 110, 112. In one embodiment, the virtual I/O server 104 is an IBM VIO Server and the virtualization module 106 is an IBM POWER Hypervisor, both running on a POWER5 computer.

The computer 102 is configured to allow an LPAR 108 to include one or more processors 114, 116 and one or more I/O devices 126, 128. The processors 114, 116, 118 and I/O devices 126, 128, 130 may be shared by multiple LPARs 108, 110, 112. For example, a first LPAR 108 includes a first processor 114, a second processor 116, a first I/O device 126, and a second I/O device 128. Typically LPARs 108, 110, 112 do not share memory so the first LPAR 108 includes a first memory 120. The second LPAR 110 is configured with the second processor 116, a second memory 122, the first I/O device 126, and the second I/O device 128. The third LPAR 112 is configured with a third processor 118, a third memory 124, the second I/O device 128, and a third I/O device 130. A computer 102 with the POWER5 architecture includes the capability to allocate to an LPAR 108 multiple processors 114, 116 and multiple I/O devices 126, 128.

The computer 102 includes multiple processors 114, 116, 118, and if the computer 102 includes the POWER5 architecture, the computer 102 may include up to 64 processors. The processors 114, 116, 118 are configured to run applications, to access storage devices 136, execute commands, etc. The processors 114, 116, 118 are configured to run an operating system, such as OS390, z/OS, etc. The computer 102 includes memory 120, 122, 124 that is typically partitioned into multiple parts. Typically a memory 120 is allocated to a single LPAR 108. In one embodiment, memory 120 may be shared by multiple LPARs 108, 110, 112. The memory 120, 122, 124 may include random access memory ("RAM"), non-volatile RAM ("NVRAM"), flash memory, dynamic RAM ("DRAM"), and the like. One of skill in the art will recognize other processor and memory types and functions.

The computer 102 includes one or more I/O devices 126, 128, 130 configured to communicate with storage devices 136, host computers, computer networks, etc. The I/O devices 126, 128, 130 may include network interface cards, network adapters, modems, wireless network adapters, etc. The I/O devices 126, 128, 130 may communicate over a fiber channel ("FC") network, a LAN, a WAN, a wireless network, a SAN, etc. The I/O devices 126, 128, 130 are configured to be controlled by the virtual I/O server 104 and each shared by one or more LPARs 108, 110, 112. Data, commands, and other computer signals, are routed from devices allocated to an LPAR 108, 110, 112 to the I/O devices 126, 128, 130 by the virtualization module 106.

The system 100 includes a SAN 132 with a storage controller 134 and one or more storage devices 136a, 136b, 136, . . . 136n. The SAN 132 typically communicates with one or more servers and host computers. Typically a SAN 132 communicates over a fiber channel network, but may communicate over an Ethernet network using Internet SCSI ("iSCSI") protocol. The SAN 132 may also use other networks and protocols. The SAN 132 includes a storage controller 134. The storage controller 134 typically routes SAN traffic to an appropriate device, controls and configures storage devices configured in a redundant array of inexpensive/independent disks ("RAID"), etc. The storage controller 134 may include servers, data movers, tape storage servers, RAM, NVRAM, and the like. The storage controller 134 typically uses SAN drivers to access data on storage devices 136. The SAN drivers are usually very well adapted to accessing multiple storage devices 136 during normal operation. One of skill in the art will recognize other storage controller 134 configurations allowing data access by an LPAR 108 of a computer 102.

The storage devices 136 may be hard disk drives, optical drives, tape storage libraries, and the like. Some of the storage devices 136 may be configured in a RAID array. The storage devices 136 are typically divided into logical storage volumes and each storage volume is assigned a logical unit number ("LUN"). For example, a RAID array may be assigned a LUN. In another example, a single disk may be assigned a LUN. In yet another example, a portion of a disk may be assigned a LUN. Each LUN typically corresponds to a physical address, or in the case of a RAID array, more than one physical address. Typically a computer 102 accessing a storage device 136 or a RAID array addresses data access commands to a LUN. One of skill in the art will recognize other ways that one or more storage devices 136 may be configured with a LUN.

The virtual I/O server 104 of the computer 102 may configure and assign a virtual SCSI device. SCSI is a standard interface and command set for transferring data between devices on internal and external computer busses. Typically, SCSI is used for hard disk drives and tape storage devices on personal computers, workstation computers, and mainframe computers, but may also connect scanners, printers, DVD drives, and the like. An internal SCSI hard disk drive is often used by a computer as a boot device and contains an image of the operating system used by the computer 102. Due to the popularity of booting a computer from a SCSI device, SCSI device drivers are usually well tested and adapted for booting computers. SCSI device drivers typically perform reliably during a boot operation, handle boot errors very well, and have a well defined set of error codes and messages.

A virtual SCSI device is typically an external physical device or a LUN, such as a storage device 136a or RAID array of a SAN 132 configured as a logical storage volume, mapped to a computer 102 as a virtual device and then assigned a SCSI identifier ("ID"). The virtual SCSI device may then be accessed by the computer 102 as a SCSI device using SCSI drivers. An external storage volume configured as a virtual SCSI device may use standard SCSI device drivers. A storage volume configured as a virtual SCSI device may be used to boot the computer 102.

The computer 102 of the system 100 includes at least one LPAR 108 with a virtual SCSI device assigned by the virtual I/O server 104. The virtual I/O server 104 creates the virtual SCSI device by mapping a LUN of a storage volume to a SCSI ID uniquely associated with the virtual SCSI device. In one embodiment, the virtual SCSI device is mapped to a LUN of the SAN 132. In another embodiment, the virtual SCSI device is mapped to a hard disk drive or other storage device that is not part of the SAN 132. The LUN of the SAN 132, in one embodiment, is mapped to one storage device 136a. In another embodiment, the LUN of the SAN 132 is mapped to multiple storage devices 136a, 136b, 136c, ... 136n configured as a RAID array.

The LUN mapped as a virtual SCSI device assigned to the LPAR 108, in one embodiment, contains an image of the operating system for the LPAR 108. The LPAR 108 may be booted by receiving a boot request that identifies the SCSI ID of the virtual SCSI device. Boot data may then be retrieved from the virtual SCSI device using a SCSI driver and the LPAR 108 is booted from the boot data retrieved from the virtual SCSI device. Booting the LPAR 108 from the virtual SCSI device, or diskless booting, is advantageous because the LPAR 108 may be booted quickly after a failure or other problem on another machine configured with an LPAR that also is booted from the LUN mapped as a virtual SCSI device to the LPAR of the failed computer. Booting from a virtual SCSI device is also advantageous because standard SCSI drivers that are stable and well adapted for booting may be used. One of skill in the art will recognize other advantages of diskless booting of an LPAR 108 using a virtual SCSI device.

Booting the LPAR 108 from the virtual SCSI device is also advantageous in migrating to a new computer 102. For example, when a computer 102 becomes obsolete, the LPAR 108 booting from a virtual SCSI device may be shut down when the obsolete computer 102 is shut down. A new LPAR 108 can be created on a new computer 102 and the LPAR 108 may be booted from the same storage volume mapped to the virtual SCSI device of the older LPAR 108. This may be accomplished by first booting a virtual I/O server 104 and virtualization module 106 of the new computer 102. The virtual I/O server 104 may be used to configure a new virtual SCSI device on the new LPAR 108 mapped to the storage volume of the previous virtual SCSI device.

Figure 2:
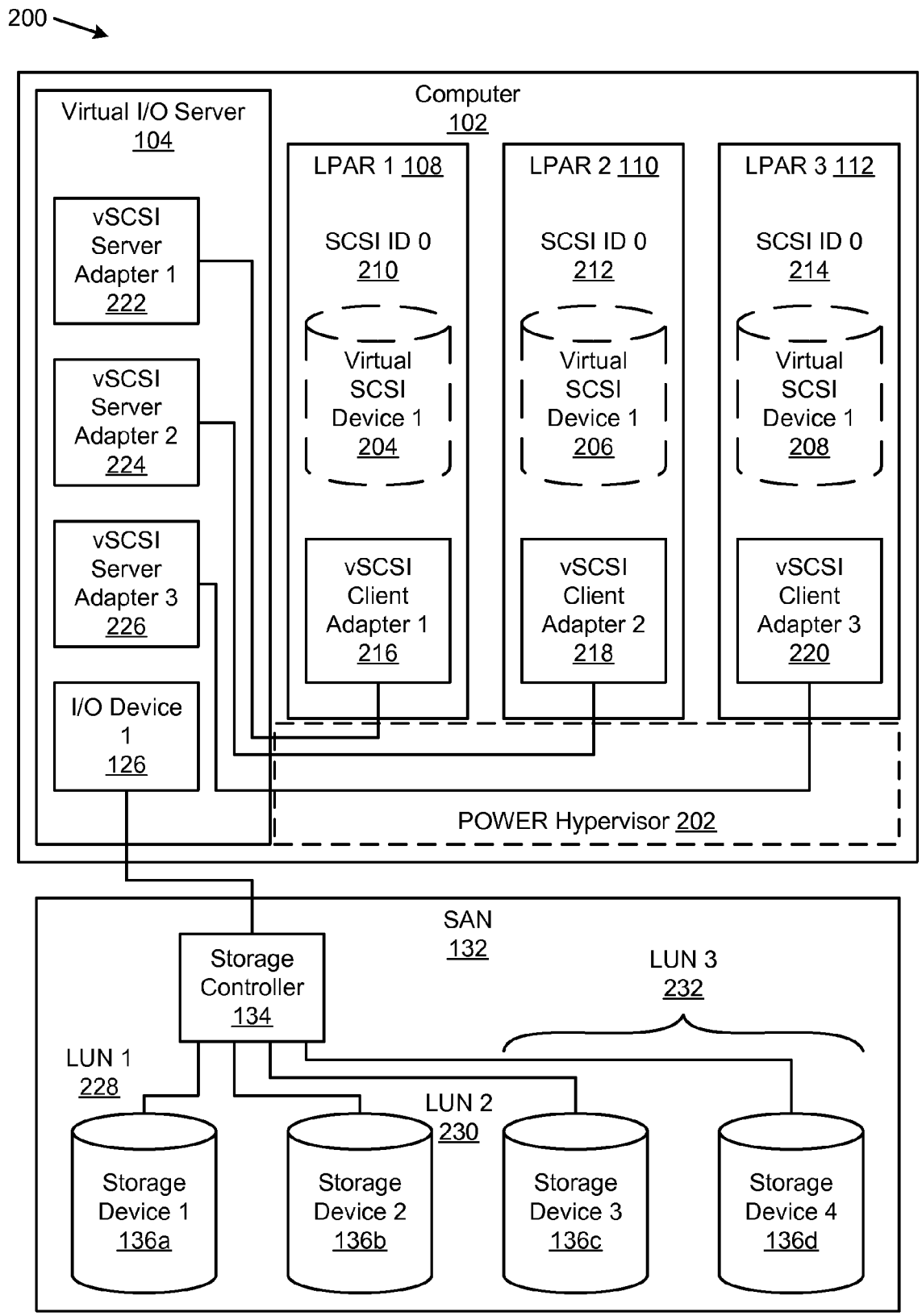
FIG. 2 is a schematic block diagram illustrating another embodiment of a system for booting a Logical Partition using an external storage device in accordance with the present invention.

FIG. 2 is a schematic block diagram illustrating another embodiment of a system 200 for booting a Logical Partition using an external storage device in accordance with the present invention. The embodiment of the system 200 depicted in FIG. 2 demonstrates an example of a virtual SCSI device mapped using a virtual I/O server 104. The system 200 includes a computer 102 with a virtual I/O server 104, a virtualization module (pictured as a POWER Hypervisor 202), LPARs 108, 110, 112, processors (not shown), memory (not shown), and I/O devices 126 (others not shown) which are substantially similar to those described above in relation to the system 100 of FIG. 1.

The system 200 also includes a SAN 132 with a storage controller 134 and storage devices 136 substantially similar to those described above in relation to the system 100 of FIG. 1. The system 200 includes LPARs 108, 110, 112 configured with virtual SCSI devices 204, 206, 208, SCSI IDs 210, 212, 214, and virtual SCSI client adapters 216, 218, 220, a virtual I/O server 104 configured with virtual SCSI server adapters 222, 224, 226, and storage devices 136 configured into LUNs 228, 230, 232, all of which are described below.

The computer 102 includes a first LPAR 108 configured with a virtual SCSI device 204 that is mapped to a first SCSI ID 210. The virtual SCSI device 204 is typically treated as any other SCSI device on the first LPAR 108. In one embodiment, the virtual SCSI device 204 is mapped to a single storage device 136a configured as a first LUN 228. The first LUN 228 is accessible through a first I/O device 126 in the computer 102, which is allocated to the first LPAR 108. In a particular embodiment, the single storage device 136a includes an image of an operating system used by the first LPAR 108. The first LPAR 108 is configured to boot up the operating system by accessing the virtual SCSI device 204 of the first LPAR 108. The first LPAR 108 retrieves boot data from the virtual SCSI device 204 using SCSI drivers. Preferably, a LUN 228 configured for booting an LPAR 108 has a one-to-one mapping with a virtual SCSI device 204 of the LPAR 108.

Similarly, the second LPAR 110 and third LPAR 112 each have a first virtual SCSI device 206, 208 and each is assigned a SCSI ID 212, 214. Note that the SCSI ID 212, 214 assigned to the second and third LPARs 110, 112 may be identical to the SCSI ID 210 assigned to the first virtual SCSI device 204 of the first LPAR 108 because the virtual I/O server 104 tracks the mapping between a virtual SCSI device 204 of an LPAR 108 and a LUN 228. For example, each of the three LPARs 108, 110, 112 may have a virtual SCSI "C:" drive with SCSI ID 0 while each of the three LPARs 108, 110, 112 may be mapped to a different LUN 228, 230, 232.

In the depicted embodiment, the second LPAR 110 includes a first virtual SCSI device 206 mapped to a SCSI ID 0 212. The virtual SCSI device 206 of the second LPAR 110 is mapped by the virtual I/O server 104 to a second LUN 230 assigned to a second storage device 136b. The third LPAR 112 includes a first virtual SCSI device 208 mapped to a SCSI ID 0 214. The virtual SCSI device 208 of the third LPAR 112 is mapped by the virtual I/O server 104 to a third LUN 232 assigned to a third and a fourth storage device 136c, 136d.

The virtual I/O server 104, in one embodiment, maps virtual SCSI devices 204, 206, 208 to the LPARs 108, 110, 112 using a server/client relationship. For example, the first LPAR 108 may include a virtual SCSI client adapter 216 that communicates with a virtual SCSI server adapter 222 located on the virtual I/O server 104. Similarly the second and third LPARs 110, 112 each include a virtual SCSI client adapter 218, 220 with a corresponding virtual SCSI server adapter 224, 226.

Virtual SCSI is based on a client and server relationship. The virtual I/O server 104 owns the physical resources and acts as a server. Physical adapters with attached disks on the virtual I/O server partition 104 may be shared by one or more LPARs 108, 110, 112, enabling client logical partitions to consolidate, and potentially minimize, the number of physical adapters required. The logical partitions access the virtual SCSI resources provided by the virtual I/O server 104 as clients.

The virtual I/O server 104 owns the physical resources and the virtual SCSI server adapters 222, 224, 226, and acts as server, or SCSI target device. The client logical partitions 108, 110, 112 have a SCSI initiator referred to as the virtual SCSI client adapter 216, 218, 220 and accesses the virtual SCSI targets 222, 224, 226 as standard SCSI LUNs. The virtual adapters are typically configured using a console. The configuration and provisioning of virtual disk resources is typically performed using the virtual I/O server 104.

Physical disks 136 owned by the virtual I/O server 104 can be either exported and assigned to a client logical partition 108, 110, 112 as a whole or can be partitioned into storage volumes (or LUNs 228, 230, 232). The LUNs 228, 230, 232 can then be assigned to different partitions. Therefore, virtual SCSI enables sharing of adapters as well as disk devices 136. To make a physical 136 or a storage volume 228, 230, 232 available to a client partition 108, 110, 112 requires that it be assigned to a virtual SCSI server adapter 222, 224, 226 on the virtual I/O server 104. The client logical partition 108, 110, 112 accesses its assigned disks through a virtual SCSI client adapter 216, 218, 220. The virtual SCSI client adapter 216, 218, 220 recognizes standard SCSI devices and LUNs 228, 230, 232 through this virtual server adapter 222, 224, 226.

The virtual I/O server 104 accurately identifies a physical volume 136 each time it boots, even if an event such as a storage area network ("SAN") 132 reconfiguration or adapter change has taken place. Physical volume attributes, such as the name, address, and location, might change after the system reboots due to SAN 132 reconfiguration. However, the virtual I/O server 104 typically is able to recognize that this is the same device and update the virtual device mappings. For this reason, in order to export a physical volume 136 as a virtual SCSI device 204, 206, 208, the physical volume 136 should have either a unique identifier ("UDID"), a physical identifier ("PVID"), or an IEEE volume attribute.

The computer 102, in one embodiment, includes a POWER Hypervisor 202 that includes the functionality of the virtualization module 106 described in relation to the system 100 of FIG. 1. The virtual I/O server 104, which may be an IBM VIO server, cooperates with the POWER Hypervisor 202 to route data access requests from an LPAR 108 to the allocated virtual SCSI device 204, and corresponding responses, though the virtual SCSI client/server adapters 216, 222 and through the I/O device 126 in communication with the LUN 228 mapped to the virtual SCSI device 204.

Figure 3:
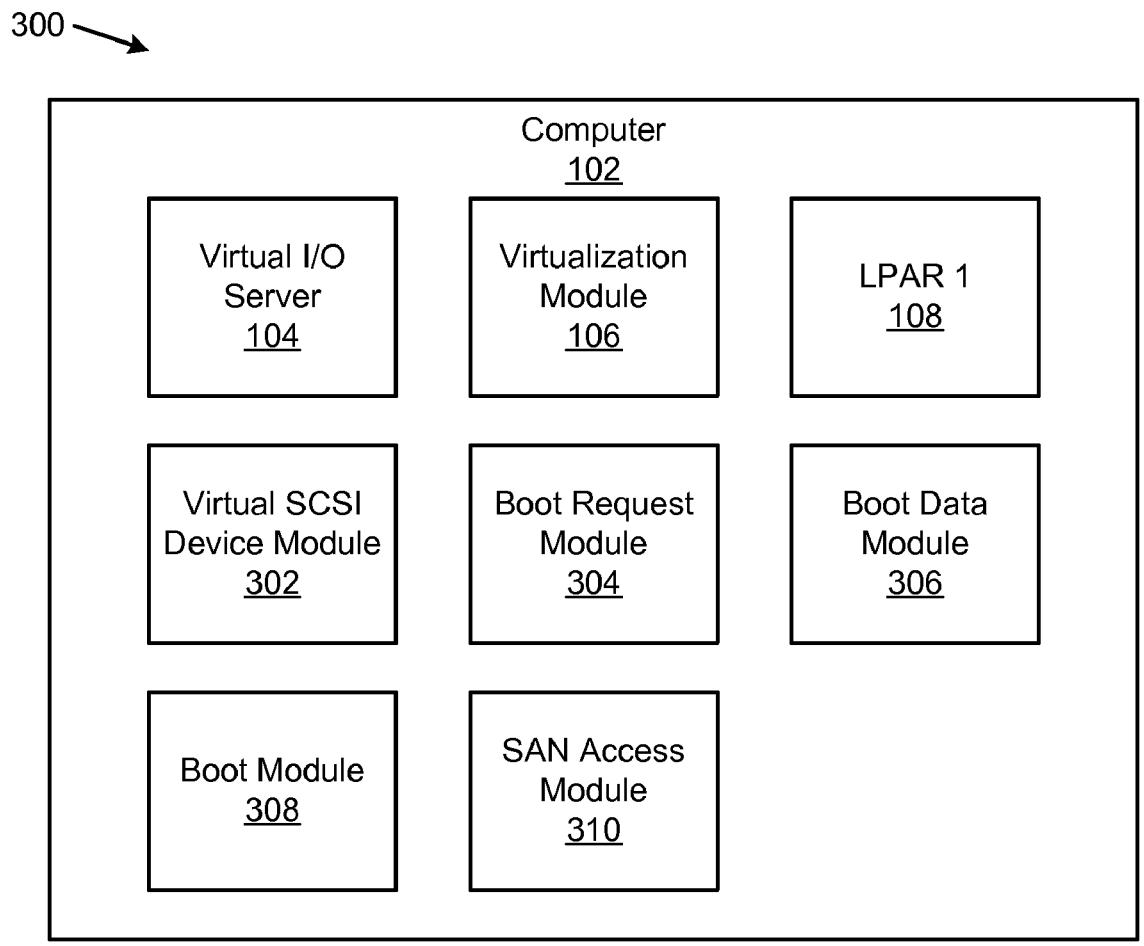
FIG. 3 is a schematic block diagram illustrating one embodiment of an apparatus for booting a Logical Partition using an external storage device in accordance with the present invention.

FIG. 3 is a schematic block diagram illustrating one embodiment of an apparatus 300 for booting a Logical Partition using an external storage device in accordance with the present invention. The apparatus 300 includes a computer 102 with a virtual I/O server 104, virtualization module 106, and a first LPAR 108, which are substantially similar to those described above in relation to the system 100 of FIG. 1 and the system 200 of FIG. 2. In addition, the apparatus 300 includes a virtual SCSI device module 302, a boot request module 304, a boot data module 306, a boot module 308, and a SAN access module 310, which are described below.

The apparatus 300 includes a virtual SCSI device module 302 that creates a virtual SCSI device 204 assigned to the first LPAR 108 of the computer 102 using the virtual I/O server 104. The virtual SCSI device module 302 creates the virtual SCSI device 204 by mapping a LUN 228 of a storage volume to a SCSI ID 210 uniquely associated with the virtual SCSI device 204. For a virtual SCSI device 204, the storage volume is located external to the computer 102.

The apparatus 300 includes a boot request module 304 that receives a boot request to boot the first LPAR 108. The boot request identifies the storage volume (LUN 228) as a boot device using the SCSI ID 210 of the virtual SCSI device 204. A boot request typically identifies a common or known location where the starting address of the operating system for the LPAR 108 resides. For example, the boot request may start booting from block 0, track 0 of SCSI ID 0 210. In this example, the virtual SCSI device module 302 would map SCSI ID 0 210 to the LUN 228 of the storage volume. The storage volume maps to one or more storage devices 136. The storage volume, in one embodiment, maps to an external storage device 136a that is not part of a SAN 132.

For example depicted in the system 200 of FIG. 2, the first storage device 136a is located in a SAN 136, is mapped as a storage volume, and given a LUN 228. The operating system image would reside on the first storage device 136a at block 0, track 0. In another embodiment, the operating system is at a different location on the first storage device 136a and the location is mapped to block 0, track 0 of the virtual SCSI device 204. One of skill in the art will recognize other ways for the boot request module 304 to identify the storage volume as a boot device using the SCSI ID 210 and the virtual SCSI device 204.

The apparatus 300 includes a boot data module 306 that retrieves boot data from the storage volume using a SCSI driver of the first LPAR 108. The storage volume is mapped to the first LPAR 108 as a virtual SCSI device 204 so SCSI drivers can be used to retrieve boot data from the storage volume. The apparatus 300 includes a boot module 308 that boots the first LPAR 108 using the boot data. Typically, the LPAR 108 boots in the same way as an LPAR that included a storage device residing in the computer 102 and allocated to the LPAR.

In one embodiment, the apparatus 300 includes a SAN access module 310 that accesses SAN data storage volumes 136 from the first LPAR 108 using SAN drivers. Typically, the SAN data storage volumes 136 would not include the storage volume mapped as a virtual SCSI device 204. Once the LPAR 108 is booted and operating normally, the SAN access module 310 allows the LPAR 108 to access other SAN storage volumes 136 using SAN drivers that are well suited for data access during operation other than boot up. Typically, because the storage volume (LUN 228) is mapped to the LPAR 108 as a virtual SCSI device 204, the storage volume 228 is unavailable for further mapping through SAN drivers. The LPAR 108 typically accesses the storage volume 228 mapped as a virtual SCSI device 204 through SCSI device drivers as a SCSI device.

Figure 4:
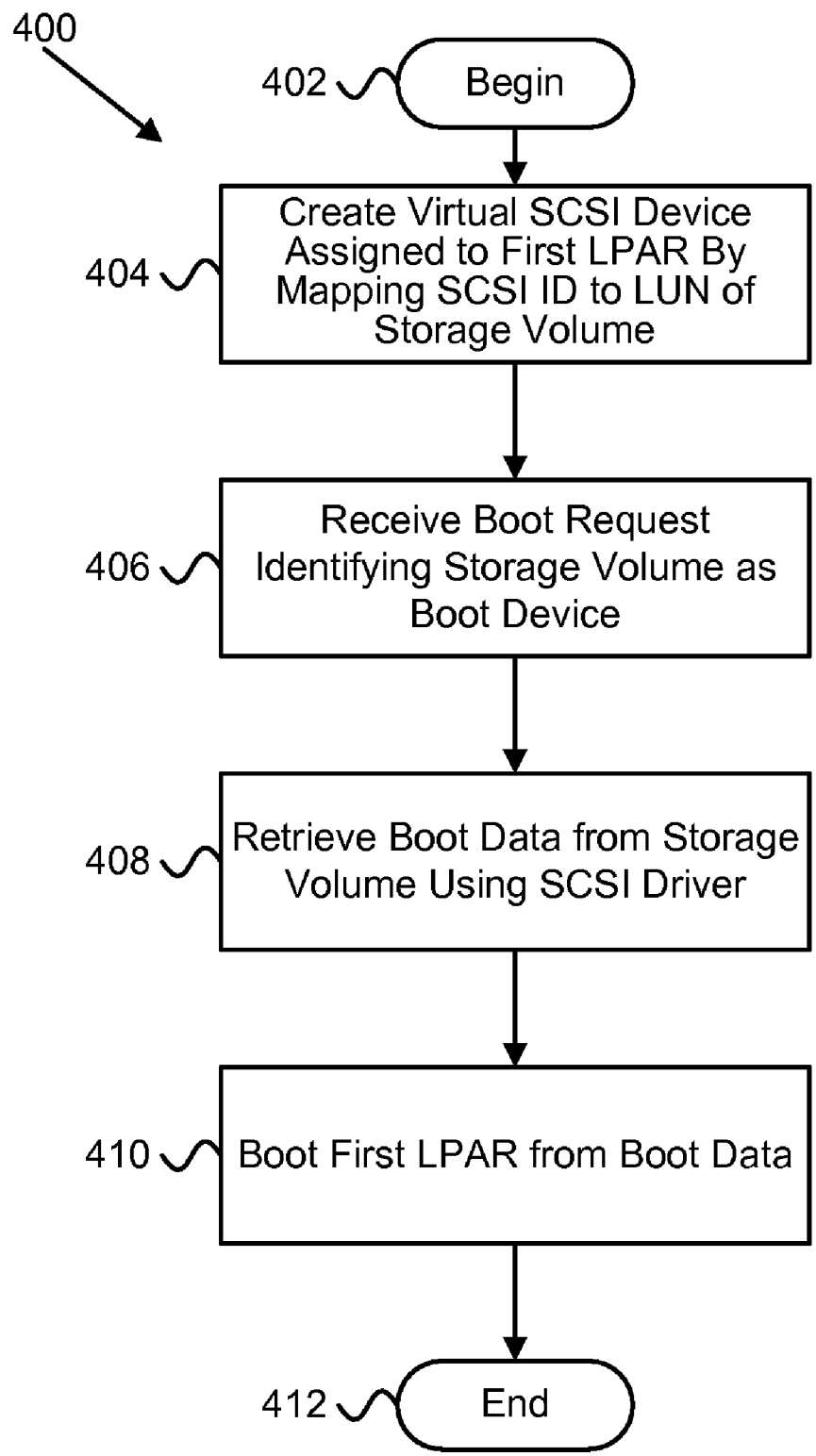
FIG. 4 is a schematic flow chart diagram illustrating one embodiment of a method for booting a Logical Partition using an external storage device in accordance with the present invention.

FIG. 4 is a schematic flow chart diagram illustrating one embodiment of a method 400 for booting a Logical Partition using an external storage device in accordance with the present invention. The method 400 begins 402 and the virtual SCSI device module 302 creates 404 a virtual SCSI device 204 assigned to a first LPAR 108 of a first computer 102 using a virtual I/O server 104 by mapping a LUN 228 of a storage volume to a SCSI ID 210 uniquely associated with the virtual SCSI device 204. The virtual I/O server 104 maps physical I/O devices 126, 128, 130 of the first computer 102 to one or more LPARs 108, 110, 112 on the first computer 102. The storage volume 104 is located external to the first computer 102, typically in a SAN 132. The first LPAR 108 is configured to share one or more physical processors 114, 116, 118 and one or more physical I/O devices 126, 128, 130 of the first computer 102 with a plurality of LPARs 108, 110, 112.

The boot request module 304 receives 406 a boot request to boot the first LPAR 108. The boot request identifies the storage volume as a boot device using the SCSI ID 210 of the virtual SCSI device 204. The boot data module 306 retrieves 408 boot data from the storage volume using a SCSI driver of the first LPAR 108, the boot module 308 boots 410 the first LPAR 108 using the boot data and the method 400 ends 412.

Figure 5:
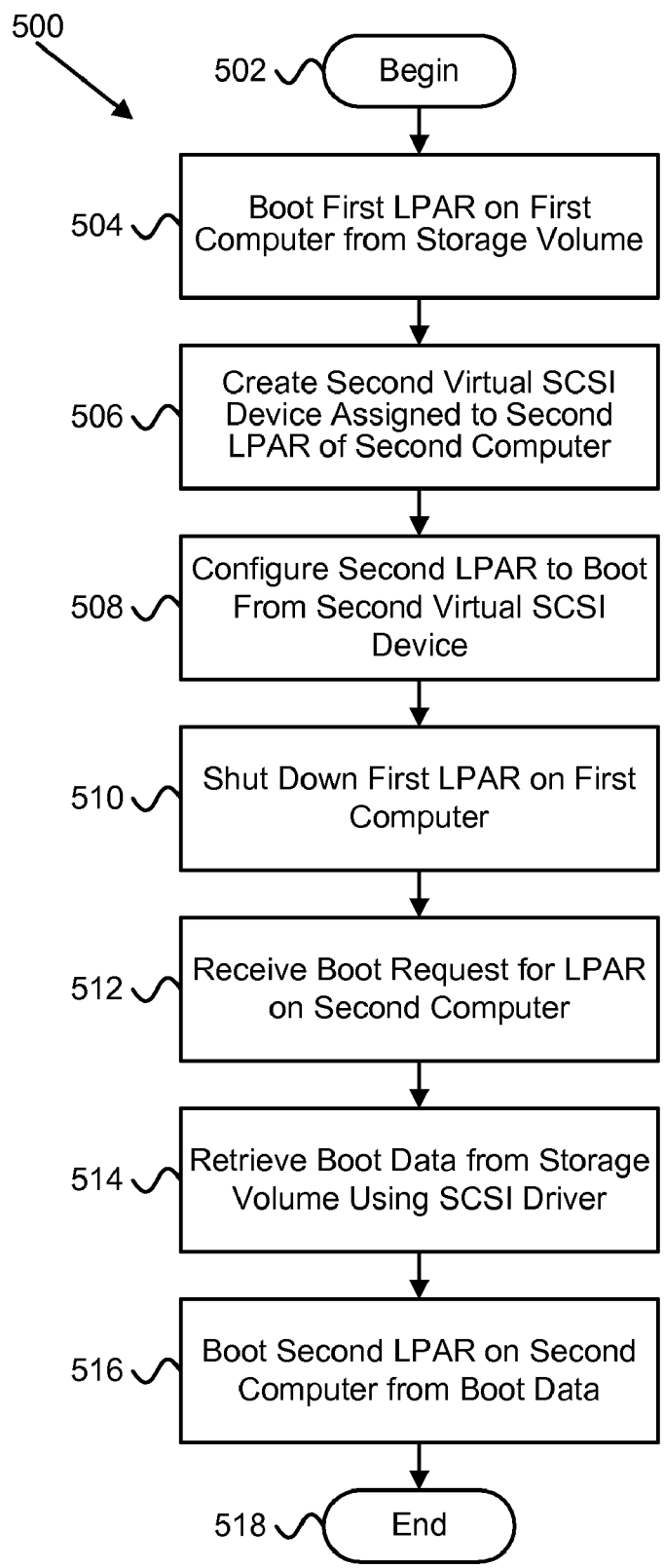
FIG. 5 is a schematic flow chart diagram illustrating another embodiment of a method for booting a Logical Partition using an external storage device in accordance with the present invention.

FIG. 5 is a schematic flow chart diagram illustrating another embodiment of a method 500 for booting a Logical Partition using an external storage device in accordance with the present invention. The method 500 begins 502 by booting 504 the first LPAR 108 on the first computer 102 from the storage volume. Booting 504 the first LPAR 108 on the first computer 102 is essentially the same as the method 400 of FIG. 4.

A virtual SCSI device module 302 of a second computer creates 506 a second virtual SCSI device on a second LPAR of a second computer. The second virtual SCSI device maps to the same LUN 228 of the storage volume. In addition, typically the second computer is replacing the first computer 102 and has more physical resources than the first computer 102. The second computer also executes a second virtual I/O server. The second virtual I/O server typically maps a physical I/O device of the second computer to one or more LPARs on the second computer. The virtual SCSI device module 302 configures 508 the second LPAR to boot from the second virtual SCSI device.

A shut down routine shuts 510 down the first LPAR 108 on the first computer 102. Typically, the first LPAR 108 is shut 510 down under the direction of a system administrator, but may also be done automatically. A boot request module 304 on the second computer receives 512 a boot request to boot the second LPAR on the second computer. The boot request identifies the storage volume used to boot the first LPAR 108 as the boot device using the SCSI ID of the second virtual SCSI device. A boot data module 306 on the second computer retrieves 514 boot data from the storage volume using a SCSI driver of the second LPAR. A boot module 308 on the second computer boots 516 the second LPAR using the boot data and the method 500 ends 518.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer readable medium having computer usable program code programmed for booting a Logical Partition using an external storage device, the operations of the computer program product comprising:

creating a virtual Small Computer System Interface ("SCSI") device assigned to a first logical partition ("LPAR") of a first computer using a virtual input/output ("I/O") server by mapping a logical unit number ("LUN") of a storage volume to a SCSI ID uniquely associated with the virtual SCSI device, the virtual I/O server configured to map a physical I/O device of the first computer to one or more LPARs on the first computer, the storage volume located external to the first computer, and the first LPAR configured to share one or more physical processors and one or more physical I/O devices of the first computer with a plurality of LPARs;

receiving a boot request to boot the first LPAR, the boot request identifying the storage volume as a boot device using the SCSI ID of the virtual SCSI device;

retrieving boot data from the storage volume using a SCSI driver of the first LPAR; and booting the first LPAR using the boot data.

2. The computer program product of claim 1, wherein the LUN of the storage volume comprises a LUN within a storage area network ("SAN") uniquely associated with the storage volume.

3. The computer program product of claim 2, wherein the virtual I/O server maps a LUN for the storage volume to the SCSI ID for the virtual SCSI device of the first LPAR through a shared physical host bus adapter in the first computer connected to the storage volume of the SAN over a fiber channel connection.

4. The computer program product of claim 1, wherein the storage volume comprises one of a storage device and a group of storage devices configured in a storage subsystem.

5. The computer program product of claim 1, wherein the virtual I/O server receives SCSI commands directed to the virtual SCSI device and issues corresponding commands to the storage volume that are compatible with the communication protocol of the storage volume.

6. The computer program product of claim 5, wherein the corresponding commands to the storage volume are SAN commands.

7. The computer program product of claim 1, wherein the mapping a SCSI ID of the virtual SCSI device to a LUN of the storage volume further comprises a unique one-to-one mapping between a LUN of the storage volume and the virtual SCSI device.

8. The computer program product of claim 1, further comprising booting the virtual I/O server prior to creating the virtual SCSI device associated with the first LPAR.

9. The computer program product of claim 1, further comprising accessing SAN data storage volumes from the first LPAR using SAN drivers, wherein the SAN data storage volumes do not include the storage volume mapped as a virtual SCSI device.

10. The computer program product of claim 1, wherein the virtual I/O server executes within a virtualization module configured to manage and control a plurality of physical processors, a plurality of physical communication adapters, a plurality of physical storage devices, and memory to provide virtual processors, virtual communication adapters, virtual storage devices, and memory to a plurality of LPARS.

11. The computer program product of claim 10, wherein the virtualization module comprises a POWER HYPERVISOR configured to execute on a Performance Optimization With Enhanced RISC 5 ("POWER5™") architecture.

12. The computer program product of claim 1, further comprising:

creating a second virtual SCSI device on a second LPAR of a second computer that also maps to the same LUN of the storage volume, the second computer having more physical resources than the first computer and executing a second virtual I/O server;

configuring the second LPAR to boot from the second virtual SCSI device;

shutting down the first LPAR on the first computer;

receiving a boot request to boot the second LPAR, the boot request identifying the storage volume as a boot device using the SCSI ID of the second virtual SCSI device;

retrieving boot data from the storage volume using a SCSI driver of the second LPAR; and booting the second LPAR using the boot data.

13. An apparatus to boot a logical partition using an external storage device, the apparatus comprising:

a virtual SCSI device module configured to create a virtual Small Computer System Interface ("SCSI") device assigned to a first logical partition ("LPAR") of a computer using a virtual input/output ("I/O") server by mapping a logical unit number ("LUN") of a storage volume to a SCSI ID uniquely associated with the virtual SCSI device, the virtual I/O server configured to map a physical I/O device of the computer to one or more LPARs on the computer, the storage volume located external to the computer, and the first LPAR configured to share one or more physical processors and one or more physical I/O devices of the first computer with a plurality of LPARs;

a boot request module configured to receive a boot request to boot the first LPAR, the boot request identifying the storage volume as a boot device using the SCSI ID of the virtual SCSI device;

a boot data module configured to retrieve boot data from the storage volume using a SCSI driver of the first LPAR; and a boot module configured to boot the first LPAR using the boot data.

14. The apparatus of claim 13, wherein the LUN of the storage volume comprises a LUN within a storage area network ("SAN") uniquely associated with the storage volume.

15. The apparatus of claim 13, wherein the virtual I/O server receives SCSI commands directed to the virtual SCSI device and issues corresponding commands to the storage volume that are compatible with the communication protocol of the storage volume.

16. The apparatus of claim 15, wherein the commands to the storage volume are SAN commands.

17. The apparatus of claim 13, further comprising a SAN access module configured to access SAN data storage volumes from the first LPAR using SAN drivers, wherein the SAN data storage volumes do not include the storage volume mapped as a virtual SCSI device.

18. A system to boot a logical partition that shares physical processors using an external storage device, the system comprising:

a storage area network ("SAN");

a storage volume accessible through the SAN by a unique logical unit number ("LUN");

a computer in communication with the storage volume through the SAN, the computer comprising one or more logical partitions ("LPAR") each configured to share one or more physical processors and one or more physical I/O devices of the computer, a virtual input/output ("I/O") server configured to map a physical I/O device of the computer to the one or more LPARs on the computer, wherein the virtual I/O server executes within a virtualization module configured to manage and control a plurality of physical processors, a plurality of physical communication adapters, a plurality of physical storage devices, and memory to provide virtual processors, virtual communication adapters, virtual storage devices, and memory to the one or more LPARS;

a virtual SCSI device module configured to create a virtual Small Computer System Interface ("SCSI") device assigned to a first LPAR of the computer using the virtual I/O server by mapping a LUN of the storage volume to a SCSI ID uniquely associated with the virtual SCSI device;

a boot request module configured to receive a boot request to boot the first LPAR, the boot request identifying the a storage volume as a boot device using the SCSI ID of the virtual SCSI device;

a boot data module configured to retrieve boot data from the storage volume using a SCSI driver of the first LPAR; and a boot module configured to boot the first LPAR using the boot data.

19. The system of claim 18, wherein the virtual SCSI device further comprises a virtual SCSI client adapter on the first LPAR and a virtual SCSI server adapter on the virtual I/O server.

* * * * *